A. A. HEIN.
COMBINED HOSE REEL, AUTOMATIC WATER DISCHARGER, AND FIRE ALARM.
APPLICATION FILED FEB. 8, 1910.
985,029.
Patented Feb. 21, 1911.
2 SHEETS—SHEET 2.
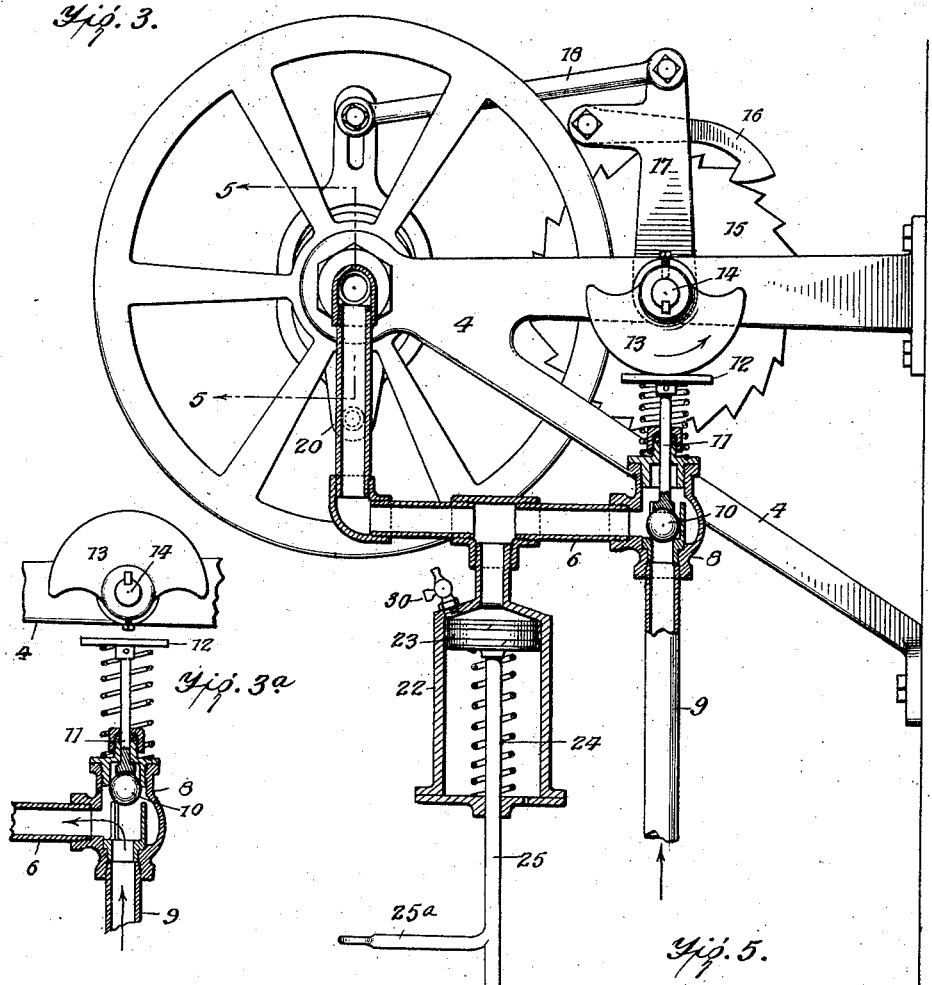
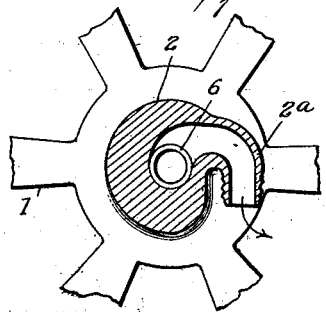
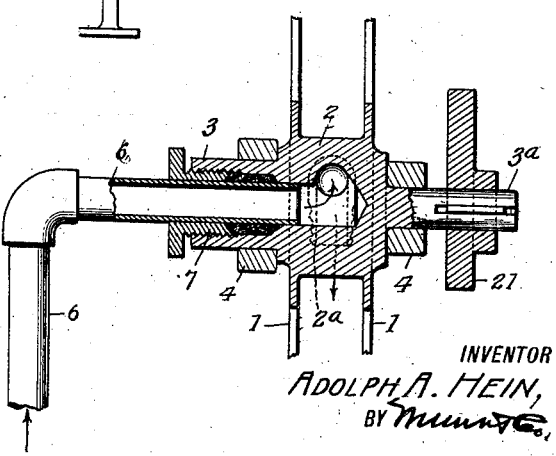
WITNESSES:
INVENTOR
ADOLPH A. HEIN,
BY
ATTORNEYS

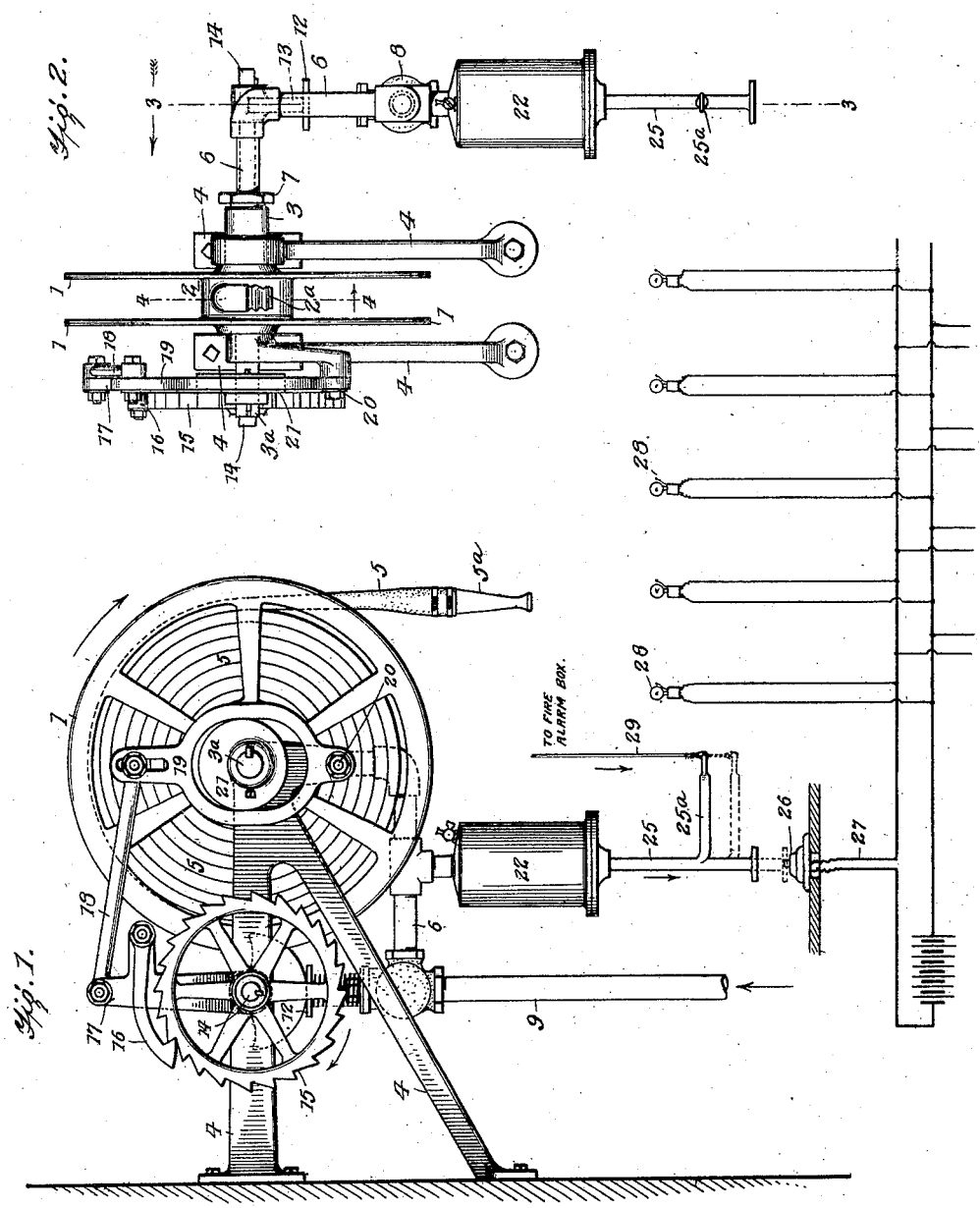

UNITED STATES PATENT OFFICE.

ADOLPH A. HEIN, OF CHARLESTON, WASHINGTON.

COMBINED HOSE-REEL, AUTOMATIC WATER-DISCHARGER, AND FIRE-ALARM.

985,029.

Specification of Letters Patent. Patented Feb. 21, 1911.

Application filed February 8, 1910. Serial No. 542,691.

*To all whom it may concern:*

Be it known that I, ADOLPH A. HEIN, a citizen of the United States, and a resident of Charleston, in the county of Kitsap and State of Washington, have invented a Combined Hose-Reel, Automatic Water-Discharger, and Fire-Alarm, of which the following is a specification.

My invention includes a fire hose-reel and attachments so constructed and combined that, when the hose has been drawn off the reel, a valve controlling discharge of water is automatically opened, and an alarm is also sounded automatically in one or more rooms in the building where the apparatus is located.

The apparatus is simple in construction and easily operated by any unskilled person.

The details of construction and operation of the apparatus are as hereinafter described, and illustrated in the accompanying drawings, in which:—

Figure 1 is a side elevation of the entire apparatus. Fig. 2 is a front elevation of the apparatus without the alarm. Fig. 3 is in part a side elevation and in part a vertical section on the line 3—3 of Fig. 2. Fig. 3$^a$ is a detail section illustrating the operation of the water-discharge valve and connected mechanism. Fig. 4 is a cross section on the line 4—4 of Fig. 2. Fig. 5 is a section substantially on the line indicated by 5—5, Fig. 3, and illustrating the form and arrangement of the water passage through the reel.

The reel is formed of two parallel sides or flanges 1, a central hub 2, and hub extensions 3, 3$^a$, constituting the axis or trunnions of the reel upon which it rotates and by which it is supported in the angular brackets 4, which, in practice, are attached to a vertical wall, whereby the whole apparatus is supported in a hallway or other place, as usual in reels of this class.

A hose 5 is, in practice, wound on the reel, as shown in Fig. 1, and provided with a nozzle 5$^a$. In case of a fire, the nozzle is seized and the hose drawn off the rotating reel, by which mechanism is automatically operated for allowing discharge of water through the hose and for sounding an alarm.

As shown in Fig. 4, the hub 2 of the reel is provided with a hollow offset or extension 2$^a$, which is curved, practically, concentrically with the hub and has at its outer end a screw-thread to provide for attachment of a hose coupling. By this construction, I avoid a sharp bend or kink in the hose and consequent impeding of the flow of water therethrough.

As shown in Fig. 5, a pipe 6 is connected with the hollow trunnion of the reel hub, and a stuffing-box is provided at 7 to prevent leakage. The said pipe 6 is connected by a valve casing 8, with a water-supply pipe 9 which is normally closed by means of a ball valve 10—see Fig. 3. The valve 10 is seated downward, and a stem 11, provided with a broad, flat disk or head 12, bears thereon and works through a stuffing-box attached to the head of the T-joint 8. A spiral spring encircles the stem 11 between the head 12 and the body of the stuffing-box. This is held normally under compression, or, in other words, when the valve is seated, as shown in Fig. 3, the spring is compressed, and, upon release of the pressure, the spring will raise the head 12 and with it the stem 11, thereby allowing the valve to rise from its seat and yield to the pressure of water in the supply-pipe 9. It will be understood that the head or pressure of water in the latter is always sufficient to cause discharge through the pipe 6, the reel proper, and the hose and nozzle with due rapidity.

The valve-closing and -releasing mechanism will now be described. A semicircular cam 13 is keyed and clamped on one end of a transverse shaft 14 having its bearings in the brackets 4, and is normally in contact with the spring-supported head or disk 12 of the water-controlling valve 10. On the other end of said shaft 14 is keyed a ratchet wheel 15—see especially Figs. 1 and 3. A hook pawl 16 is pivoted to a lever 17 which is mounted loosely and rotatably on the shaft 14. A link 18 connects such lever 17 with an eccentric strap or lever 19, which is pivoted at 20 on a pendent arm of one of the brackets, as shown best in Fig. 1. The body of the lever 19 is provided with a large opening adapted to receive an eccentric 21, which, as shown in Fig. 1, is mounted on the reel shaft or trunnion 3$^a$. It will now be seen that when the hose 5 is drawn off the reel 1, the lever 19 will be vibrated or oscillated on its pivot 20 by means of the eccentric 21, which will be rotated with the reel, and thereby, through the medium of the link 18 and lever 17, the hook pawl will be alternately engaged with and released from the ratchet wheel 15 so as to rotate the latter intermittently, but always in one direction; and that thereby the semicircular cam 13 will be rotated intermittently in the direction of the arrow, as shown in Fig. 3, and finally carried out of contact with the head 12 of the valve stem 11, as indicated in Fig. 3ª, so that the valve will be released and allow free discharge of water from pipe 9 through the pipe 6, the reel hub, and the hose, as before stated.

The mechanism for sounding an automatic alarm is constructed as follows. A cylinder 22—see Figs. 1 and 3—is pendent from the horizontal portion of pipe 6 with which it is connected by means of a T-joint. A piston 23 is arranged therein and supported by a spiral spring 24. The stem 25 of the piston projects below the lower end of the cylinder, and, as shown in Fig. 1, is provided with a head arranged for contact with a push-button 26, by which an electric circuit 27 may be closed through a series of alarms 28, which, in practice, will be located at various selected points, preferably in the living or sleeping rooms of the house or building in which the apparatus may be located. The stem 25 is likewise provided with a lateral arm 25ª with which a rope or wire 29 may be connected for extension to a general or special alarm. It will now be apparent that, since the head of the cylinder 22 is open to access of water from the pipe 6, the piston therein will be subjected to the same pressure as may exist in the said pipe when the water is turned on, and the pressure will, in all cases, be sufficient to overcome the tension of the spring 24 and thus force the piston-rod downward and sound the various alarms described. A small pet-cock 30 is attached to the upper end of the cylinder 22, and may be used to ascertain if water leaks past the valve 10, whereby a false alarm will be prevented. As shown in Fig. 1, the arm of the cam lever 19 with which the link 18 is connected, is provided with a slot to allow adjustment for varying the throw of the pawl lever 17, as may be required.

It is obvious that any unskilled person may operate this apparatus by simply seizing the nozzle and drawing the hose off the reel, which will result in the automatic discharge of water and the sounding of one or more alarms, as already indicated. The hose will be made of such length as required for the particular location where the reel may be placed. It will not be necessary in case of fire to awaken or inform persons in sleeping rooms or other portions of the building, since the apparatus will automatically effect this without any attention or manipulation on the part of the person operating the hose. The apparatus is particularly useful in hotels and lodging houses, or wherever else it is necessary to give an alarm in a series of rooms or places.

What I claim is:—

1. The combination of a rotatable reel having a hollow hub and trunnion, a hose attached to the hub and adapted to be wound thereon, a water conductor connected with the hub, a valve controlling passage of water through said conductor, a device holding the valve normally seated, an eccentric mounted on one of the reel trunnions, a pivoted lever connected with said eccentric and operated thereby, and mechanism connecting said lever with the valve holding device and consisting of a rotatable ratchet wheel, a pivoted hook pawl for engaging the same, a link connecting the pawl with the eccentric lever, a rotatable shaft on which the ratchet wheel is keyed and the pawl mounted, and a cam keyed on said shaft and coacting with the valve-holding device to release the same when the hose is unwound from the reel, substantially as described.

2. The combination of a rotatable reel having a hollow hub and trunnion, a hose connected with the hub and adapted to be wound thereon, a water conductor connected with the hollow trunnion, a valve arranged therein for normally closing the passage, a slidable stem bearing on the valve and having a head outside the conductor, a compression spring arranged between the head and the adjacent portion of the conductor and tending normally to unseat the valve, and means operatively connecting the reel with the said stem and adapted, upon rotation of the reel, to release such stem and thus permit automatic discharge of water, substantially as described.

3. The combination of a rotatable hose-reel, a water conductor, and alarm mechanism connected therewith, the same consisting of a cylinder in open connection with said conductor, a slidable spring-supported piston arranged within said cylinder and provided with a projecting stem, and an alarm proper arranged for operation by said stem, substantially as described.

4. The combination of a rotatable hose-reel having a hollow trunnion and hub, a hose connected with the latter and adapted to be wound thereon, a valve controlling passage of water in the conductor, means operatively connecting the reel with the valve whereby, upon rotation of the former, the valve is released, a cylinder having an open connection with the conductor between the reel and valve, a slidable piston arranged in the cylinder and having a projecting stem adapted for operative connection with an alarm, so that, upon release of the valve, water has access under pressure to the aforesaid piston, whereby the alarm is operated automatically as specified.

ADOLPH A. HEIN.

Witnesses:
 FRED R. MITCHELL,
 OSWALD A. WEIDLICH.